United States Patent [19]

Vincent et al.

[11] 3,954,803
[45] May 4, 1976

[54] DILACTONE CHROMOGENIC COMPOUNDS AND PREPARATION THEREOF

[75] Inventors: David N. Vincent, Glenview; Cheng Hsiung Chang, Chicago, both of Ill.

[73] Assignee: Champion International Corporation, Stamford, Conn.

[22] Filed: Jan. 2, 1974

[21] Appl. No.: 430,142

Related U.S. Application Data

[62] Division of Ser. No. 329,293, Feb. 5, 1973, Pat. No. 3,819,396.

[52] U.S. Cl. ............................. 260/335; 282/27.5
[51] Int. Cl.² ..................................... C07D 311/86
[58] Field of Search ................. 260/335; 117/36.2

[56] References Cited
UNITED STATES PATENTS

| | | | |
|---|---|---|---|
| 656,426 | 8/1900 | Schmidt | 260/335 |
| 3,244,549 | 4/1966 | Farnham et al. | 117/36.2 |

FOREIGN PATENTS OR APPLICATIONS

| | | | |
|---|---|---|---|
| 28,638 | 1902 | United Kingdom | 260/335 |
| 116,057 | 11/1900 | Germany | 260/335 |
| 3,497 | 1895 | United Kingdom | 260/335 |

*Primary Examiner*—Norma S. Milestone
*Attorney, Agent, or Firm*—Roylance, Abrams, Berdo & Kaul

[57] ABSTRACT

A substantially colorless dilactone chromogenic material having the structural formula

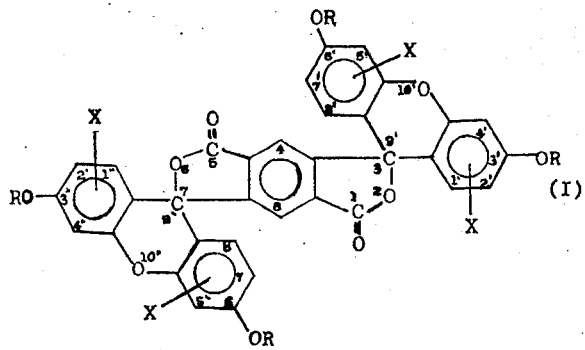

(I)

and

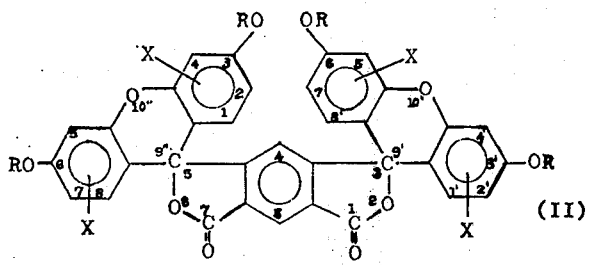

(II)

wherein
R represents an alkyl group, an aryl group, an aralkyl group, an acyl group or an aroyl group; and
X represents a hydrogen atom, a halogen atom, an alkyl group or a nitro group.

The dilactone compounds are produced from precursor compounds that are formed by reacting pyromellitic dianhydride with a resorcinol having at least the fourth or the sixth position unsubstituted, in the presence of a dehydrating agent to form xanthyl derivatives of isophthalic and terephthalic acid. These precursors are then further reacted to form the dilactones. The dilactones are used in pressure-sensitive copy systems comprising a support bearing microcapsules containing the dilactones, alone, or in combination with other chromogenic materials.

21 Claims, No Drawings

DILACTONE CHROMOGENIC COMPOUNDS AND PREPARATION THEREOF

This is a division of application Ser. No. 329,293 filed Feb. 5, 1973, now U.S. Pat. No. 3,819,396 to Vincent and Chang.

This invention relates to chromogenic compounds, precursors for such compounds, the production of such compounds and to the use of such compounds in pessure-sensitive record material. More particularly, this invention relates to substantially colorless, dilactone chromogenic compounds which are converted to a yellow color when placed in reactive contact with Lewis acid materials, such as in a pressure-sensitive copy system.

Numerous marking systems have been suggested which improve localized contact between a chromogenic compound and a color-developing substance in areas where a colored marking is desired. Pressure-sensitive mark-forming systems are described, for example, in U.S. Pat. Nos. 3,418,656 and 3,418,250 to A. E. Vassiliades. These patents describe a marking system wherein a substantially colorless chromogenic substance is incorporated in minute oil droplets which are disposed within and thus form the core of pressure-rupturable microcapsules. The microcapsules are coated onto a substrate which may be utilized adjacent a receiving sheet that is coated with an acidic material, such as a Lewis acid-treated clay. Upon application of localized pressure, the microcapsules are ruptured and the colorless chromogenic substance is released and reacts with the electron acceptor to provide a distinctive mark.

Various chromogenic compounds have been proposed for use in such marking systems. Previously proposed chromogenic compounds include, for example, the rhodamine dilactone. Certain difficulties are experienced with particular dilactones that have been previously suggested. For example, certain of the rhodamine dilactones have a tendency towards premature opening of the lactone rings causing premature coloration by moisture, for example, present in the atmosphere. Thus, such water sensitivity prevents a successful utilization of the chromogenic compounds in copy systems where the compounds must remain substantially colorless until the microcapsule containing the chromogenic materials are ruptured.

In accordance with the present invention, there is provided substantially colorless, chromogenic compounds having the structural formula

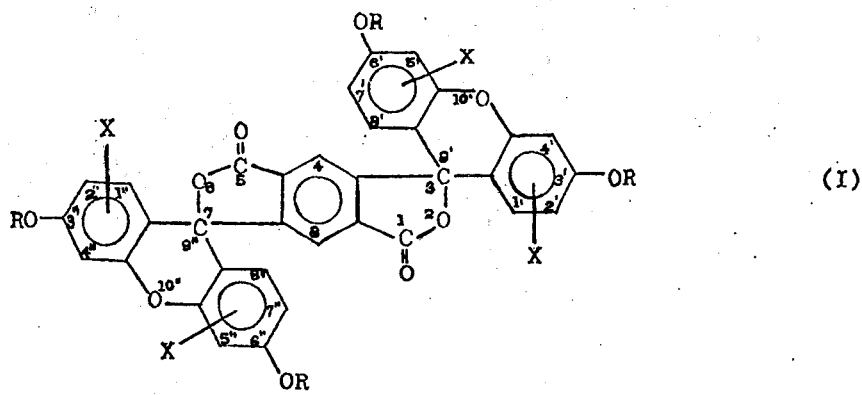

(I)

and

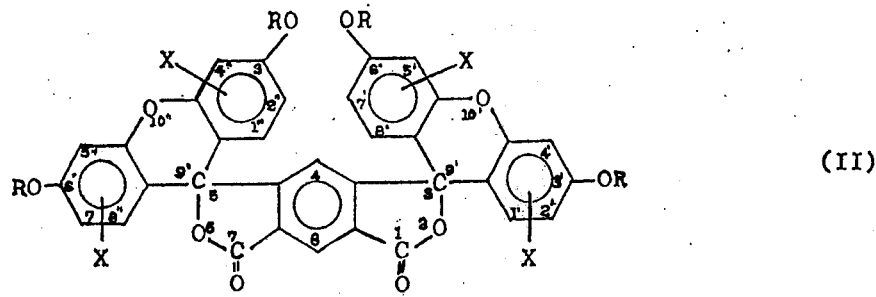

(II)

wherein:
R represents an alkyl group, an aryl group, an aralkyl group, an acyl group or an aroyl group; and
X represents a hydrogen atom, a halogen atom, an alkyl group or a nitro group.

The colorless dilactones of the present invention can be converted to yellow colored markings upon reaction with Lewis acid materials. Significantly, the dilactone compounds of the present invention are essentially insoluble in water, and thus may be easily encapsulated by dispersing the chromogenic substance in an oily solvent and suspending the resultant material in the form of microscopic droplets in an oil-in-water emulsion without premature coloration of the dye intermediate. In addition, once the present chromogenic compounds are encapsulated, they are insensitive to moisture present in the atmosphere and thus may be stored until use without premature coloration. Moreover, dilactones of the present invention may be added to conventional blue imaging systems which contain, for example, Crystal Violet Lactone and Benzoyl Leuco Methylene Blue and thus provide improved blue images that are readily reproducible by xerographic processes. Still further, black images may be formed by combining the present dilactones with other chromogenic materials as will be hereinafter illustrated.

Preferably, the dilactone compounds of the present invention have the structural formulae (I) and (II) wherein:

R represents a lower alkyl group containing from 1 to 4 carbon atoms, e.g. methyl, ethyl, propyl, butyl, an aryl group, e.g. phenyl, tolyl, etc., an aralkyl group, e.g. benzyl, phenethyl, etc., a lower acyl group, e.g. acetyl, butyryl, etc. or an aroyl group, e.g. benzoyl, etc., and X represents a hydrogen atom, a chlorine or bromine atom, an alkyl group containing from 1 to 20 carbon atoms, e.g. methyl, propyl, dodecane, eicosane, or a nitro group.

Examples of such compounds include:
trans 3,7-bis[3',6'-dimethoxy-9'-spiroxanthyl]pyromellitide,
cis 3,5-bis[3',6'-dimethoxy-9'-spiroxanthyl]pyromellitide,
trans 3,7-bis[4',5'-dimethyl-3',6'-dimethoxy-9'-spiroxanthyl]pyromellitide,
cis 3,5-bis[4',5'-dimethyl-3',6'-dimethoxy-9-spiroxanthyl]pyromellitide,
trans 3,7-bis[2',7'-dichloro-3',6'-dimethoxy-9'-spiroxanthyl]pyromellitide,
cis 3,5-bis[2',7'-dichloro-3',6'-dimethoxy-9'-spiroxanthyl]pyromellitide,
cis 3,5-bis[3',6'-diacetoxy-9'-spiroxanthyl]pyromellitide,
trans 3,7-bis[3',6'-diacetoxy-9'-spiroxanthyl]pyromellitide,
cis 3,5-bis[3',6'-dibutyroxy-9'-spiroxanthyl]pyromellitide,
trans 3,7-bis[3',6'-dibutyroxy-9'-spiroxanthyl]pyromellitide,
cis 3,5-bis[3',6'-dibenzyloxy-9'-spiroxanthyl]pyromellitide,
trans 3,7-bis[3',6'-dibenzyloxy-9'-spiroxanthyl]pyromellitide,
trans 3,7-bis[3',6'-dibenzoxy-9'-spiroxanthyl]pyromellitide,
cis 3,5-bis[3',6'-dibenzoxy-9'-spiroxanthyl]pyromellitide, and the like.

According to another aspect of the present invention, dilactone precursor compounds are produced by reacting pyromellitic dianhydride with a resorcinol, which has at least the fourth or sixth position unsubstituted, in the presence of a dehydrating agent to form xanthyl derivatives of isophthalic and terephthalic acid as follows:

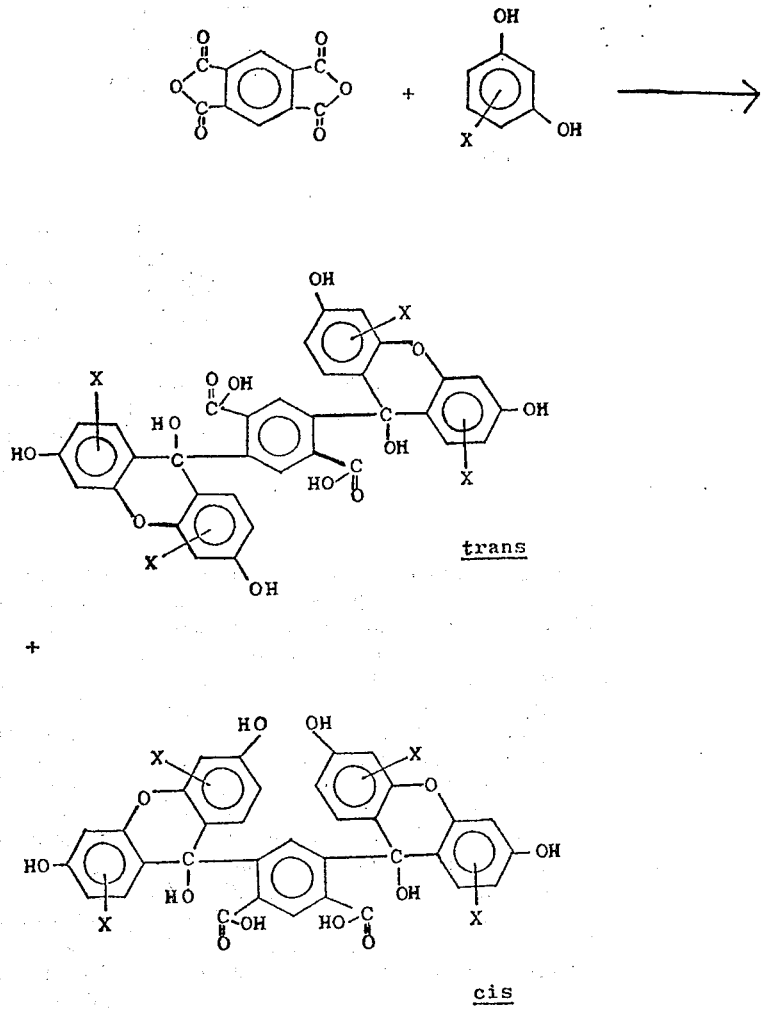

As previously indicated, the resorcinol or dihydroxy phenol must be unsubstituted at either the 4 or 6 position. Suitable resorcinols include, for example, 2-methyl resorcinol, 5-methyl resorcinol, 4-ethyl resorcinol, 4-n-propyl resorcinol, 5-n-pentyl resorcinol, 4-n-dodecyl resorcinol, 4-chloro resorcinol and the like.

Suitable dehydrating agents include, for example, anhydrous zinc chloride, boron trichloride etherate, and the like. The formation of the xanthyl derivatives of isophthalic and terephthalic acid as shown above, may be conducted under any suitable conditions. For example, this reaction takes place readily at elevated temperatures of between about 180° and about 250°C. without solvents for a period of time between about one and about 5 hours.

The reaction can also be carried out in a solvent in which both of the reactants are either soluble or are at least partially soluble. Preferably, the solvents have boiling points within the range of 100° to 175°C., permitting the reaction to be carried out under reflux conditions. Suitable solvents include toluene, xylene, and the like, which solvents are well-known to those skilled in the art.

The dilactone precursors may be converted to the dilactone chromogenic compounds by various techniques. According to a further aspect of the invention, the hydroxyl groups contained in each precursor molecule can be alkylated by any standard alkylation procedure as shown by the following reaction for the cis and trans isomers:

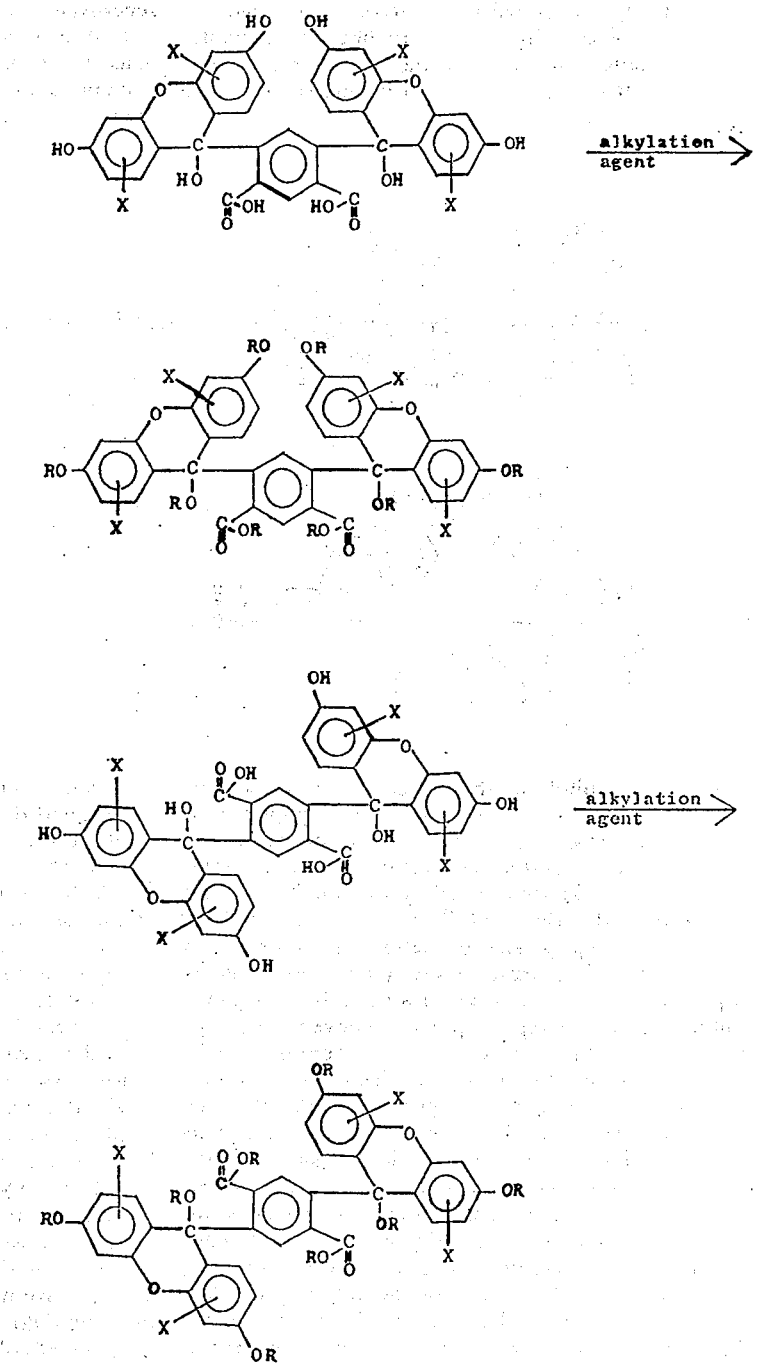

The alkylation of the hydroxyl groups in the foregoing reactions involves the substitution of an alkyl group, an aryl group or an aralkyl group for the hydrogen of each hydroxyl group. Such alkylation may be readily accomplished using a suitable alkylating agent, such as, for example, a dialkyl sulfate, e.g., dimethyl sulfate, diethyl sulfate, etc. diazomethane, benzyl or phenyl halide, such as benzyl chloride or monobromobenzene, etc. The alkylated products are then saponified followed by acidifcation to form the desired cis and trans dilactone chromogenic compounds.

Alternatively, the dilactone precursors, i.e., the xanthenyl derivatives of isophthalic and terephthalic acid can be reacted with a suitable esterifying agent to form esterified dilactones. Thus, the precursors may be reacted with a suitable acylation agent, such as acetic anhydride, butyric anhydride, acetyl chloride, benzoyl chloride, benzoic anhydride, or the like. For example, employing acetic anhydride as the acylation agent, the following reaction takes place, for the cis isomer under reflux conditions is used in combination with another sheet or substrate which contains the acidic co-reactant. This system is normally referred to as a "transfer system" and the rupture of the microcapsules results in a transfer of the dilactone chromogen from the microcapsulecoated sheet to an acid-coated sheet upon which a colored mark is provided. The colorless dilactones of the present invention may be utilized in any pressure-sensitive system where they are isolated from an acidic co-reactant prior to the formation of the desired colored marking. Any of the well-known acidic materials including bentonite, kaolin, acidic clays, talc, aluminum silicate, calcium citrate, metal oxides, metal chlorides, or the like may be utilized as the acidic coreactant for the present dilactones.

As previously mentioned, the dilactones of the present invention provide a yellow color upon contact with a Lewis acid material. However, the dilactones may be used in combination with other colorless chromogenic compounds. Thus, for example, the present dilactones may be used to improve a conventional blue imaging

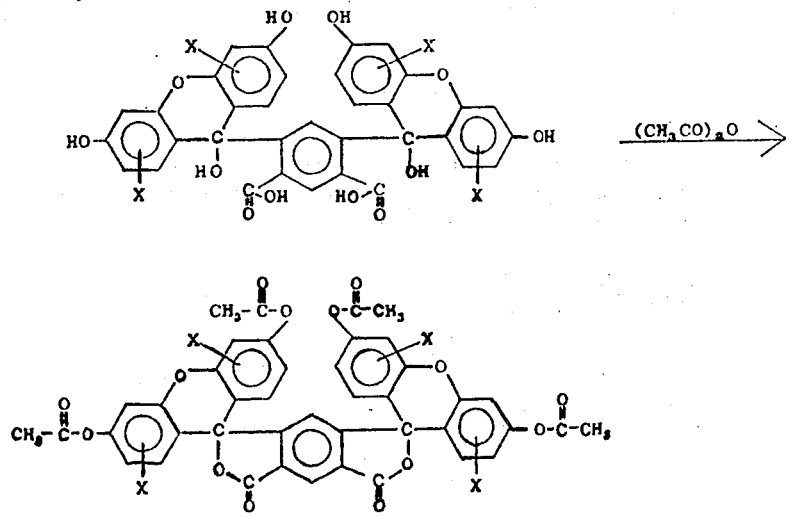

According to still another aspect of the present invention, the dilactone compounds are employed in pressure-sensitive copy systems. Thus, the dilactone chromogenic compounds are incorporated into minute oily droplets and encapsulated by any suitable process, such as those described in U.S. Pat. Nos. 3,418,250 and 3,418,565, which patents are hereby incorporated by reference. The microcapsules may be coated onto or incorporated into a web or substrate, such as paper, and utilized in any type of pressure-sensitive copy system whereby the microcapsules are ruptured under localized pressure to release the dilactones for contact with an acidic co-reactant to provide a colored image. Thus, the microcapsule-bearing substrate may comprise a single sheet, wherein the microcapsules containing the dilactone and the acidic co-reactant. such as a suitable Lewis acid are coated onto a single substrate. Such system is usually referred to as a "self-contained" or "autogenous system", since the colorless chromogenic material and the acid co-reactant are present on the same substrate. Alternatively, the microcapsules containing the dilactones of the present invention may be coated onto or incorporated into a substrate which system, such as those comprising Crystal Violet Lactone and Benzoyl Leuco Methylene Blue. The addition of the present dilactones to such systems improve the xeroxability of the resulting images. Similarly, the dilactones of the present invention may be combined with still other colorless chromogenic compounds to provide black images having improved xerographic reproduction qualities.

Any suitable amount of the dilactone chromogenic compounds of the present invention may be employed in the formation of microcapsules for use in pressure-sensitive systems. For example, between about 0.2 and about 2.0 parts by weight of the dilactone may be employed for each 100 parts by weight of the oily material which forms the core of the microcapsule. Preferably, between about 0.6 and about 1.5 parts by weight of the dilactone per 100 parts by weight of the oily core material may be suitably employed. Larger amounts of the dilactone may be utilized, if desired. However, large amounts are normally not necessary since the greater quantities do not provide a correspondingly greater intensity of color and, of course, the use of such larger amounts is economically undesirable. As previously indicated, when the dilactones are combined with blue imaging dye substances such as Crystal Violet Lactone and Benzoyl Leuco Methylene Blue, or the like, the resultant image has been found to be better reproducible by normally blue insensitive copying methods, such as the xerographic methods now in use. This can be accomplished without materially modifying the visible blue color of the resultant image. Thus, when dilactones of the present invention are combined with other chromogenic materials, it is preferred to use between about 0.1 and about 0.8 parts by weight of the dilactone with about 1.5 to about 3.5 parts by weight of the blue image dye substance, all based upon 100 parts by weight of the oily material which will form the core of the microcapsules. If desired, additional amounts of the present lactone chromogenic materials may be added to give a greenish hue to the resultant colored image.

The invention will be further illustrated by the following examples. The percentages are by weight unless otherwise specified.

EXAMPLE 1

A mixture of 13.1 grams of pyromellitic dianhydride, 26.4 grams of resorcinol, and 18 grams of boron trifluoride etherate in 300 milliliters of dry xylene is refluxed for 3 hours. Near the end of the reflux, a brownish insoluble mass is formed and collected by filtration. Recrystallization from acetone-water in the ratio of 1:5 yields 20.8 grams of xanthyl derivatives of isophthalic acid and terephthalic acid.

Twenty grams of anhydrous sodium carbonate are added to a solution of 20 grams of the formed acids in 400 milliliters of anhydrous acetone. The mixture is brought to boiling and 40 grams of dimethyl sulfate are added slowly. During the two hours reflux, a 20 percent methanolic potassium hydroxide solution is used to keep the solution at pH 8. The solution is cooled, filtered, and neutralized with acetic acid. Upon the addition of water, a lightly yellowish precipitate is obtained. The infrared spectrum of the dried sample shows no hydroxyl groups.

The product is a mixture of dimethyl 4,6-bis[9'-(3',-6',9'-trimethoxy)xanthyl]isophthalate and dimethyl 2,5-[9'-(3',6',9'-trimethoxy)xanthyl]terephthalate.

The esters are further hydrolyzed with a 20 percent methanolic potassium hydroxide solution at refluxing temperature for 2 hours at a pH greater than 13. The solution is then cooled, neutralized with acetic acid, and extracted with toluene. An almost colorless solid is obtained after the removal of the toluene. Successive recrystallizations from acetone result in the separation of two isomeric color-formers. From the precipitate, there is obtained 5.8 grams of trans 3,7-bis[3',6'-dimethoxy-9'-spiroxanthyl]pyromellitide, having a melting point of 362°C., and an absorptive maximum in 95 percent acetic acid at 441 mµ. From the mother liquor, 4.0 grams of cis 3,5-bis[3',6'-dimethoxy-9'-spiroxanthyl]pyromellitide are obtained having an absorptive maximum in 95 percent acetic acid at 442 mµ and a melting point of 320°C.

EXAMPLE 2

The procedure described in Example 1 is repeated, except that resorcinol is replaced by an equivalent amount of a substituted resorcinol. Thus, 2-methyl resorcinol is utilized to form trans 3,7-bis[4',5'-dimethyl-3',6'-dimethoxy-9'-spiroxanthyl]pyromellitide and cis 3,5-bis[4',5'-dimethyl-3',6'-dimethoxy-9'-spiroxanthyl]pyromellitide, while 4 chlororesorcinol is employed to form trans 3,7-bis[2',7'-dichloro-3',6'-dimethoxy-9'-spiroxanthyl]pyromellitide and cis 3,5-bis[2',-7'-dichloro-3',6'-dimethoxy-9'-spiroxanthyl]pyromellitide.

EXAMPLE 3

The benzyloxy derivative is formed by following the procedure of Example 1, except that instead of using dimethyl sulfate, an equivalent amount of benzyl chloride in aqueous sodium hydroxide is added to the hydroxy acid precursor solution. The cis and trans bis[3',-6'-dibenzyloxy-9'-spiroxanthyl]pyromellitides are formed.

EXAMPLE 4

The tetracetate derivates are prepared by refluxing 10 grams of the xanthyl derivatives of isophthalic acid and terephthalic acid obtained in Example 1 in 100 milliliters of acetic anhydride for a period of 4 hours. Excess acetic anhydride is removed by distillation. The addition of 170 milliliters of ethanol causes the formation of a tarry material which is then boiled in water for a period of 30 minutes. Recrystallization from benzene-petroleum ether yields 5.2 grams of cis 3,5-bis[3',6'-diacetoxy-9'-spiroxanthyl]pyromellitide and its trans isomer having a melting point of 275°C.

EXAMPLE 5

The procedure of Example 4 is repeated with the exception that butyric anhydride is used instead of acetic anhydride. Recrystallization from benzene-petroleum ether yields 5.5 grams of cis 3,5-bis[3',6'-dibutyroxy-9'-spiroxanthyl]pyromellitide and its trans isomer having a melting point of 295°C.

EXAMPLE 6

The procedure of Example 4 is followed with the exception that 100 milliliters of benzoyl chloride are substituted for the acetic anhydride. THe mixture is heated at a temperature of 140°–145°C. for a period of 3 hours. About 50 milliliters of benzoyl chloride are removed under reduced pressure. Petroleum ether is added to the cooled residue to precipitate out the product and dissolve the unreacted benzoyl chloride. The resulting insoluble material is boiled in water for 30 minutes and then recrystallized from acetone yielding 6.3 grams of cis 3,5-bis[3',6'-dibenzoxy-9'-spiroxanthyl]pyromellitide and its trans isomer having a melting point of 319°–323°C.

EXAMPLE 7

Following the general microencapsulation procedure described in U.S. Pat. No. 3,418,656, microcapsules are prepared containing the dilactone color chromogenic compounds prepared in Example 1, above. Thus, an oily mixture is formed containing one part by weight of each isomeric dilactone formed in Example 1, 51 parts of coconut oil and 34 parts of a partially hydrogenated (40%) terphenyl (specific gravity 1.005, flash point 345°F. and pour point −28°C. - commercially available from Monsanto Chemical Company as HB-40). The oily mixture is emulsified in 500 parts of a 6 percent by weight aqueous solution of methyl cellulose. The emulsion is maintained under continuous agitation and 20 parts by weight of a B-stage ureaformaldehyde resin are added to the emulsion. The resulting microcapsules are then coated onto a sheet of paper.

The coated paper is then brought into contact with an acidic clay-coated sheet, and localized pressure is applied with the stylus of a typewriter to rupture the capsules and release the dilactones for reaction with the clay-coated sheet. A yellow mark instantly develops on the clay-coated sheet.

EXAMPLE 8

Isomeric mixtures of the chromogenic compound formed in Examples 2 and 3 are microencapsulated and coated onto sheets of paper in the manner described in Example 7. When each of the coated papers is brought into contact with a clay-coated sheet, respectively, and localized pressure applied by means of a typewriter, a yellow mark instantly develops on each of the clay-coated sheets.

EXAMPLE 9

The procedure of Example 7 is repeated, with the exception that instead of utilizing the dilactone chromogenic compounds, alone, mixtures of 2.1 parts of Crystal Violet Lactone and 1.8 parts of Benzoyl Leuco Methylene Blue are combined with 0.3 part of a mixture of trans 3,7-bis[3',6'-dimethoxy-9'-spiroxanthyl]-pyromellitide and cis 3,5-bis[3',6'-dimethoxy-9'-spiroxanthyl]pyromellitide.

A blue colored image develops on the clay-coated paper upon rupture of the microcapsules, and the resulting image is readily duplicated by a xerographic copying machine.

parts by weight of a mixture of trans 3,7-bis[3',6'-dimethoxy-9'-spiroxanthyl]pyromellitide and cis 3,5-bis[3',6'-dimethoxy-9'-spiroxanthyl]pyromellitide, 0.02 part by weight of 7,7'-bis(3-diethylaminofluoran), 0.8 part by weight of 7,7'-isopropylidene-bis(3-diethylaminofluoran), 1.3 parts by weight of Crystal Violet Lactone, and 0.6 part by weight of Benzoyl Leuco Methylene Blue.

The preparation of the bisfluorans is disclosed in co-pending U.S. patent application Ser. No. 329,294, filed Feb. 5, 1973, now U.S. Pat. No. 3,821,010 to Vincent and Chang entitled "Bisfluoran Chromogenic Compounds, Preparation Thereof, and Pressure-Sensitive Copy Systems Employing Same".

A black image, which is capable of being xerographically reproduced, is immediately formed on the clay-coated paper upon rupture of the capsules by the application of localized pressure using a typewriter stylus. The resulting image has good reproducibility using a Xerox duplicating machine.

This invention has been described in considerable detail with particular reference to preferred embodiments, but it will be understood that variations and modifications can be effected within the spirit and scope of the invention as described in the appended claims.

What is claimed is:

1. A chromogenous compound having a formula selected from the group consisting of

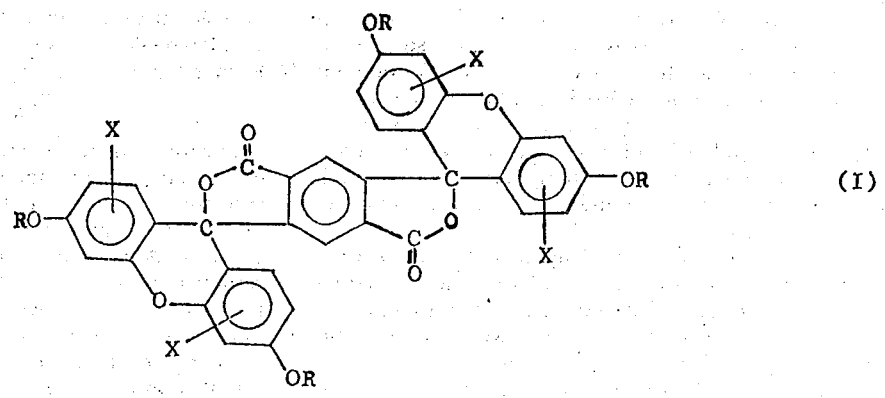

and

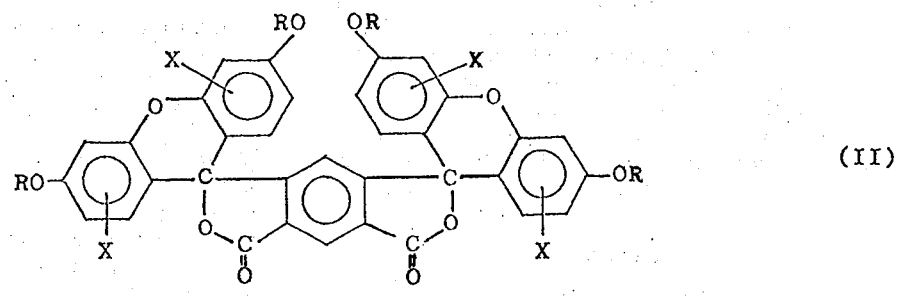

EXAMPLE 10

The procedure of Example 7 is followed, while utilizing a mixture of chromogenic compounds including 1.2 wherein:
R represents an alkyl group, an aryl group, an aralkyl group, an acyl group or an aroyl group; and X represents a hydrogen atom, a halogen atom, an alkyl group or a nitro group.

2. The compound of claim 1 wherein:
R represents a lower alkyl group, an aryl group, a benzyl group, a lower acyl group or a benzoyl group; and
X represents a hydrogen atom, a chlorine atom, a bromine atom, an alkyl group or a nitro group.

3. The compound of claim 2 wherein R is methyl and X is hydrogen, said compounds being trans 3,7-bis[3',-6'-dimethoxy-9'-spiroxanthyl]pyromellitide and cis 3,5-bis[3',6'-dimethoxy-9'-spiroxanthyl]pyromellitide.

4. The compound of claim 2 wherein R is methyl and X is methyl, said compounds being trans 3,7-bis[4',5'-dimethyl-3',6'-dimethoxy-9'-spiroxanthyl]pyromellitide and cis 3,5-bis [4',5'-dimethyl-3',6'-dimethoxy-9'-spiroxanthyl]pyromellitide.

5. The compound of claim 2 wherein R is methyl and X is chlorine, said compounds being trans 3,7-bis[2',7'-dichloro-3',6'-dimethoxy-9'-spiroxanthyl]pyromellitide and cis 3,52',7'-dichloro- 3', 6'-dimethoxy- 9'-spiroxanthyl]pyromellitide.

6. The compound of claim 2 wherein R is benzyl and X is hydrogen, said compounds being trans 3,7-bis[3',-6'-dibenzyloxy-9'-spiroxanthyl]pyromellitide and cis 3,5-bis[3',6'-dibenzyloxy-9'-spiroxanthyl]pyromellitide.

7. The compound of claim 2 wherein R is acetyl and X is hydrogen, said compounds being trans 3,7-bis[3',-6'-diacetoxy-9'-spiroxanthyl]pyromellitide and cis 3,5-bis[3',6'-diacetoxy-9'-spiroxanthyl]pyromellitide.

8. The compound of claim 2 wherein R is butyryl and X is hydrogen, said compounds being trans 3,7-bis[3',-6'-dibutyroxy-9'-spiroxanthyl]pyromellitide and cis 3,5-bis[3',6'-dibutyroxy-9'-spiroxanthyl]pyromellitide.

9. The compound of claim 2 wherein R is benzoyl and X is hydrogen, said compounds being trans 3,7-bis[3',6'-dibenzoxy-9'-spiroxanthyl]pyromellitide and cis 3,5-bis[3',6'-dibenzoxy-9'-spiroxanthyl]pyromellitide.

10. A process which comprises reacting pyromellitic dianhydride with a resorcinol having at least the 4 or the 6 position unsubstituted in the presence of a dehydrating agent and a solvent in which said dianhydride and said resorcinol are at least partially soluble, to form xanthyl derivatives of isophthalic and terephthalic acid.

11. The method of claim 10 wherein said solvent has a boiling point within the range of 100° to 175° C.

12. The method of claim 11 wherein said solvent is xylene.

13. The method of claim 11 wherein said reaction takes place under reflux conditions.

14. The process of claim 11 wherein the product of said process is filtered to recover an insoluble mass.

15. The process of claim 11 wherein said resorcinol has the formula

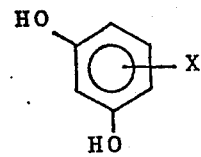

wherein X represents a hydrogen atom, an alkyl group, a halogen atom or a nitro group.

16. The process of claim 15 wherein the xanthyl derivatives are alkylated, and the alkylated xanthyl derivatives are subjected to saponification and acidification to provide dilactone chromogenic compounds.

17. The process of claim 16 wherein the alkylation is conducted in the presence of dimethyl sulfate, diethyl sulfate, diazomethane, benzyl chloride or monobromobenzene as the alkylation agent.

18. The process of claim 17 wherein said alkylation agent is dimethyl sulfate and X represents hydrogen.

19. The process of claim 15 wherein the xanthyl derivatives are reacted with an acylation agent to form esterified dilactones.

20. The process of claim 19 wherein said acylation agent is acetic anhydride, butyric anhydride or benzoyl chloride.

21. The process of claim 20 wherein said acylation agent is benzoyl chloride.

* * * * *